(12) United States Patent
Paert

(10) Patent No.: US 12,032,674 B2
(45) Date of Patent: Jul. 9, 2024

(54) METHOD AND SYSTEM FOR MANAGING ACCESS TO A SERVICE

(71) Applicant: THALES DIS FRANCE SAS, Meudon (FR)

(72) Inventor: Jonas Paert, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 374 days.

(21) Appl. No.: 17/419,402

(22) PCT Filed: May 29, 2019

(86) PCT No.: PCT/EP2019/064098
§ 371 (c)(1),
(2) Date: Jun. 29, 2021

(87) PCT Pub. No.: WO2020/141025
PCT Pub. Date: Jul. 9, 2020

(65) Prior Publication Data
US 2022/0067138 A1    Mar. 3, 2022

(30) Foreign Application Priority Data
Dec. 31, 2018   (EP) .................................... 18216000

(51) Int. Cl.
*G06F 21/41* (2013.01)
(52) U.S. Cl.
CPC .................................. *G06F 21/41* (2013.01)
(58) Field of Classification Search
CPC ......... G06F 21/41; G06F 21/31; H04L 67/02; H04L 63/0815; H04L 63/08; H04L 63/10
See application file for complete search history.

(56) References Cited

U.S. PATENT DOCUMENTS

| 2004/0250118 A1* | 12/2004 | Andreev | ............ H04L 63/0815 |
| | | | 726/8 |
| 2005/0060553 A1* | 3/2005 | Allen | .................. H04L 63/0869 |
| | | | 713/182 |
| 2014/0181944 A1 | 6/2014 | Ahmed et al. | |

FOREIGN PATENT DOCUMENTS

EP    2761527 B1    2/2019

OTHER PUBLICATIONS

Ahamed, "Integrated Windows Authentication(IWA) with Kerberos and WSO2 Identity Server", Dec. 2016, XP055602179, URL: https://medium.com/@farasath/integrated-windows-authentication-with-kerberos-and-wso2-identity-server-ffcd8263a0fl, 6 pages.

(Continued)

*Primary Examiner* — Beemnet W Dada

(57) ABSTRACT

The invention method comprises: authenticating successfully, by a user authentication server, through a logon agent in a device, a device user; sending, by the user authentication server, to the logon agent, session data relating to the successful authentication session; sending, by the logon agent, to a logon application the session data; receiving, by at least one browser, from the device user, a first request for accessing the service with a first server identifier; sending, by the logon application, to the at least one browser, the session data; sending, by the browser, based on the first server identifier, to a first receiving server, the session data; verifying, by the first receiving server, whether the session data is or is not valid, and, if yes, authorizing access to the service.

10 Claims, 3 Drawing Sheets

(56) References Cited

OTHER PUBLICATIONS

International Search Report (PCT/ISA/210) and Written Opinion (PCT/ISA/237) mailed on Jul. 11, 2019, by the European Patent Office as the International Searching Authority for International Application No. PCT/EP2019/064098.

* cited by examiner

METHOD AND SYSTEM FOR MANAGING ACCESS TO A SERVICE

FIELD OF THE INVENTION

The invention relates, in a general manner, to a method and a system for managing access to a service.

More particularly, the present invention applies to a system including a Personal Computer (or PC), as a local (user) device, and a user authentication server, as a remote server.

STATE OF THE ART

As known per se, a PC user is prompted to provide his/her credentials, such as a username and a password, so as to logon to his/her PC. The PC user is also prompted to provide her/his credentials, by using a (web) browser, as a user interface, so as to access a Service Provider (or SP), as a remote server. Thus, even if the credentials provided to access the SP is the one to logon to the PC, the user is asked to provide it twice which is not convenient for the concerned user.

There exists a solution termed Kerberos, as a Single Sign On (or SSO) solution. The Kerberos solution allows benefiting from user credentials that has been entered once by a user without prompting him/her to re-enter his/her credentials to access an SP that requires the user authentication.

Such a Kerberos solution uses a logon software application, during which a user is asked to provide his/her credentials, that gets a Kerberos Ticket-Granting Ticket (or TGT) from a TGT issuing server. Then, an SP software application that also requires a user authentication uses the TGT that proves the user identity to acquire a service ticket without asking the user to provide again his/her credentials.

However, the Kerberos solution has at least the drawback that the SP has to trust the TGT that does only mean that a user authentication has occurred without knowing any information relating to the logon session.

SUMMARY OF THE INVENTION

The invention eliminates notably such a drawback by providing a method for managing access to a service.

According to the invention, the method comprises:
authenticating successfully, by a user authentication server, through a logon agent, a device user, the device comprising the logon agent;
sending, by the user authentication server, to the logon agent, session data, the session data relating to the successful authentication session;
sending, by the logon agent, to a logon application the session data;
storing, by the logon application, the session data;
receiving, by at least one browser, from the device user, a first request for accessing the service, the first service access request including or being accompanied with an identifier relating to a first server to be addressed, the device comprising the at least one browser;
sending, by the logon application, to the at least one browser, the session data;
sending, by the browser, based on the first server identifier, to, as a first receiving server, either the first server or through the user authentication server, to the first server, the session data;
verifying, by the first receiving server, whether the session data is or is not valid; and
authorizing, by the first receiving server, only if the session data is valid, access to the service.

The invention is based on a transmission, from a Logon APplication (or LAP) to a (user) device (web) browser(s), of data relating to a previous (user) logon (authentication) session, as (logon) session data.

The LAP is therefore involved to allow accessing, from a browser(s), the session data.

The invention solution uses a Logon AGent (or LAG) relating to a user device Operating System (or OS), such as Windows (registered trademark). The LAG is used to interface with, on the one hand, the LAP and, on the other hand, a User Authentication Server (or UAS) that authenticates successfully, at the logon session, the user.

Once the browser has received, from the LAP, the session data, the browser transmits to the UAS or an SP, as a receiving server, the session data that is then checked, by the receiving server, to allow access to the SP, when applicable (i.e. only when the session data is valid).

As the invention solution takes a decision based on the session data to access the SP, the invention solution is therefore secure.

When the UAS is the receiving server, the UAS is used firstly to authenticate successfully the user and secondly to check whether the session data is or is not correct. In the affirmative, the UAS grants access to the SP.

Contrary to the Kerberos solution, the receiving server, i.e. either the UAS or the SP, decides, based on the session data (and not a TGT which does not give any information about the (logon) session that has taken place), to grant (or not) subsequently access to the SP.

The proposed solution is adapted to a cloud SP.

Advantageously, the session data further includes information relating to user authentication data that has been used to authenticate successfully the user.

Contrary to the Kerberos solution, the receiving server, namely the UAS or the SP, may know which kind of authentication data or which authentication data, depending on the session data information, has been effectively used to authenticate the user at the device logon session.

Moreover, when the session data is considered sufficiently secure, by the receiving server, depending on the session data information, to access the service, the invention solution is user friendly. As a matter of fact, the user is not prompted once again to provide any additional user authentication data to access the service and is thus not frustrated (to have to provide other user authentication data than the already provided user authentication data at the logon session).

According to a further aspect, the invention is a system for managing access to a service.

According to the invention, the system comprises a device and a user authentication server. The device comprises a logon agent and at least one browser. The device is configured to authenticate successfully, through the logon agent, to the user authentication server, a device user. The user authentication server is configured to send, to the logon agent, session data, the session data relating to the successful authentication session. The logon agent is configured to send to a logon application the session data. The logon application is configured to store the session data. The at least one browser is configured to receive, from the device user, a first request for accessing the service. The first service access request includes or is accompanied with an identifier relating to a first server to be addressed. The logon application is configured to send to the at least one browser the session data. The at least one browser is configured to send, based on the first server identifier, to, as a first receiving server, either the first server or through the user authentication server, to the first server, the session data. And the first receiving server is configured to verify, whether the session data is or is not valid and authorize, only if the session data is valid, access to the service.

As a device, it may include, among others, e.g., a PC, a terminal, a desktop computer, a laptop computer, a handset, a mobile telephone and/or a Personal Digital Assistant (or PDA), as a computing device.

BRIEF DESCRIPTION OF THE DRAWINGS

Additional features and advantages of the invention will be more clearly understandable after reading a detailed description of two preferred embodiments of the invention, given as indicative and not limitative examples, in conjunction with the following drawings.

DETAILED DESCRIPTION OF ONE EMBODIMENT

Herein under is considered a case in which the invention method for managing access to a service is implemented by a PC, as a (user) device, and a UAS, as a first remote server, to an SP, as a second remote server, that provides the service.

However, it is only for exemplifying purposes and is not considered to reduce the scope of the present invention.

Figure 1:
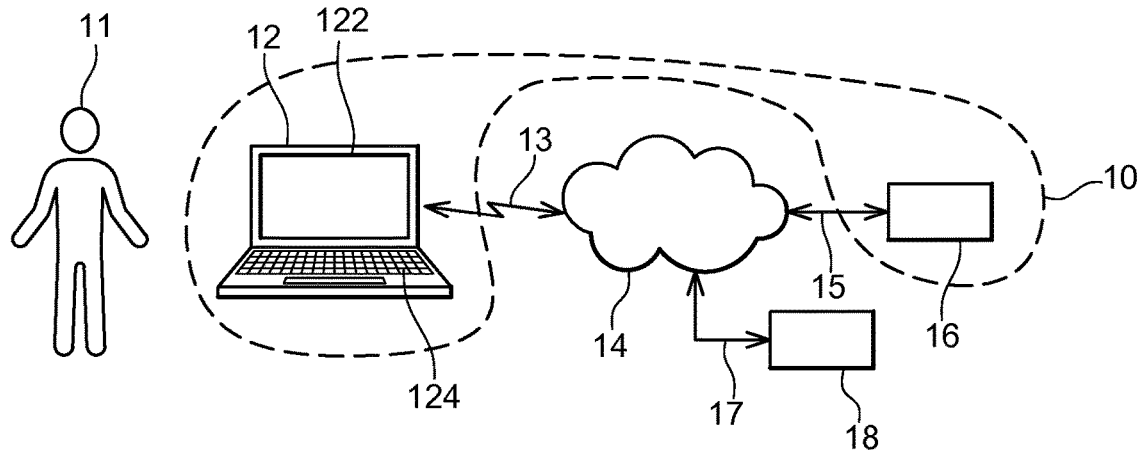
FIG. 1 illustrates a simplified diagram of an embodiment of a system comprising a PC and a UAS, and being adapted, through a LAG, to authenticate the user to the UAS at a (PC) logon session and to provide, through a LAP and a (PC) browser(s), the UAS or an SP that is requested by the user to be accessed, with data relating to the (logon) session, according to the invention.

FIG. 1 shows an electronic system 10 comprising a PC 12, as a (local) (user) computing device, and a UAS 16, as a first remote computing device, and an SP 18, as a second remote computing device.

As known per se (not represented), the PC 12 comprises, among others, one or several Central Processing Unit(s) (or CPU), processor(s), (micro)processor(s) and/or (micro)controller(s), as data processing means, one or several memories, as data storing means, and one or several Input/Output (or I/O) interfaces that are all connected to each other.

The PC 12 includes, as a Man Machine Interface (or MMI), a display screen 122 for displaying information to a PC user 11, and a keyboard 124 used by the PC user 11 notably for entering and/or selecting data, so as to interact with the user 11.

The PC 12 is connected, via a wired or wireless link 13, like e.g., a Bluetooth (registered trademark), a Near Field Communication (or NFC) or a Wi-Fi (registered trademark) type link, to a communication network(s) 14, such as Internet, an Intranet and/or a mobile radio-communication network(s).

The PC 12 may cooperate with a Secure Element (or SE) (not represented) that is incorporated in the PC 12 or communicatively coupled to the PC 12.

Within the present description, an SE is a smart object that includes a chip and that, on the one hand, protects access to data that the chip stores or processes and, on the other hand, is intended to communicate with the outside world.

For example, the SE can have any form factor, such as a dongle of the USB (acronym for "Universal Serial Bus") type, a smart card, an MMC (acronym for "MultiMediaCard") card, or an SD (acronym for "Secure Digital") Card, or any other electronic medium that may have different form factors. According to another example, the SE can also be a chip embedded, incorporated or fixed, in a removable manner, to the cooperating PC 12, or a chip to be soldered in the cooperating PC 12, as an host computer. The SE may be an embedded chip, such as an embedded Universal Integrated Circuit Card (or eUICC) or a chip that is included in a smart card, like e.g., a Subscribed Identity Module (or SIM) type card or the like.

The PC 12 supports one or several OSs, such as Windows (Trademark).

The PC 12 (or the SE) comprises or supports an (OS) Logon (client) AGent (or LAG) (not represented), as a software component to be installed on the PC 12, to implement the invention.

The LAG facilitates a collection of first user authentication data, such as a password.

The LAG is used for getting, at a (PC) logon session, first user authentication data that is entered or submitted from the user 11.

The first user authentication data may include:
a user identifier, such as a username;
a password;
a One-Time Password (or OTP);
a passphrase;
a Personal Identity Number (or PIN); and/or
user biometric data, such as one or several fingerprints.

The first user authentication data is used, by the UAS, to authenticate (or not) the user 11.

The PC 12 is preferably able to capture and transmit, through the LAG, to the UAS 16, the first user authentication data.

The PC 12 is configured to authenticate successfully (or not), through the LAG, to the UAS 16, the user 11.

The PC 12 (or the SE) comprises or supports an (OS) Logon (client) APplication (or LAP) (not represented), as another additional software component to be installed on the PC 12, so as to implement the invention.

The LAG is intended to interact with, on the one hand, the UAS 16 and, on the other hand, the LAP.

The LAG is used for transmitting the first user authentication data to the UAS 16.

The LAG is also used for getting, from the UAS 16, a result of the user authentication, i.e. either a failure of the user authentication, like e.g., a user authentication failure message, or a success of the user authentication, like e.g., a user authentication success message that further includes or is accompanied with data relating to the (logon) session that is issued by the UAS 16 after a successful user authentication.

In case of successful user authentication at (logon) session, the LAG is used for transmitting to the LAP the data relating to the session and requesting the LAP to store the data relating to the session.

The LAG completes or achieves the PC 12 logon process, so that the user 11 has been successfully logged on or connected to the PC 12.

The PC 12 runs the LAP, as a local server, that is to be inserted as an interlocutor to a browser.

Once the LAP has received the session data, the LAP stores the session data possibly in a secure enclave or an SE cooperating with the PC 12.

The LAP, like e.g., a plug-in, is intended to interact with a (web) browser(s) (not represented), to provide one or several specific functions "on-demand", in order to create an additional capability(ies) to extend the browser capability (ies). For example, the capability(ies) include(s) rights for writing and/or reading a file(s) or a library(ies), in order to transfer data relating to the session for authenticating the user 11 at a PC logon, that can be edited with the installed plug-in.

The LAP may be used as a local server embedded in the PC 12 (or a cooperating SE).

Alternatively, instead of a local server, the LAP is supported by a remote server.

According to an essential invention feature, the LAP is adapted to retrieve (or get) the stored session data and to transmit to the browser the session data.

To transmit to the browser the session data, the LAP is arranged to receive, preferably a session data request originating from a configured browser or an execution of executable data, such as a JavaScript, by the browser.

The browser interprets and executes the executable data, such as a JavaScript included within a (down)loaded (web) page, requesting the browser to address the LAP, as a local (or remote) server. As known per se, JavaScript is a scripting language that has been standardized by ECMA (stands for European Computer Manufacturers Association) International within the ECMA-262 specification.

The (or each) browser is arranged to receive, from the user 11, a request for accessing a service provided by the SP 18. The service access request includes or is accompanied with a Uniform Resource Locator (or URL), as an IDentifier (or ID) relating to the SP 18, as the server to be addressed.

The (or each) browser may be configured (or controlled) to transmit, based on the ID relating to the server to be addressed, the session data to, as a first receiving server, the UAS 16 or the SP 18.

The UAS 16 is preferably connected, over a (bi-directional) wireless and/or wired link(s) 15, through the communication network(s) 14, to the PC 12.

The UAS 16 is identified by e.g., a Uniform Resource Identifier (or URI), such as an URL, an Internet Protocol (or IP) address and/or the like, as an ID(s) relating to the UAS 16. The UAS 16 ID(s) is(are) preferably stored at the PC 12 side (e.g., in a PC 12 memory and/or an SE memory incorporated or coupled to the PC 12).

The UAS 16 may be operated by a Mobile Network Operator (or MNO), a Mobile Virtual Network Operator (or MVNO), a bank operator, a security service provider or on its behalf.

The UAS 16 is hosted preferably by a first computing device including, among others, one or several CPUs and/or processor(s) (not represented), as data processing means, one or several memories (not represented), as data storing means, and one or several I/O interfaces that are all connected to each other.

The UAS 16 (processor) is used for running an invention application (or software) for managing access to a service provided by the SP 18.

The UAS 16 includes (or is connected to) a server memory(ies) that stores a first database that includes data relating to a plurality of user accounts.

The UAS 16 accesses the first database.

The first database comprises preferably a set of user accounts and, in association with each user account, one or several IDs relating to the concerned user, such as a username or an International Mobile Subscriber Identity (or IMSI). Each user account may be associated with one or several IDs relating to a corresponding user device(s) and, as user device ID, such as an Internet Protocol (or IP) address, a Mobile Station International Subscriber Directory Number (or MSISDN) and/or an International Mobile Equipment Identity (or IMEI). Furthermore, each user ID is associated with corresponding reference logon (user) authentication data, as first reference user authentication data, such as a reference Personal Identification Number (or PIN), a reference password, a reference OTP or a reference password and a reference OTP.

The first (or a second) database comprises, in association with each user account, preferably a set of one or several service provider accounts that are associated each with a corresponding SP and an SP access policy. Moreover, each user ID is associated with corresponding reference further (user) authentication data, as second reference user authentication data, such as a reference PIN, a reference OTP, a reference password, a reference OTP or a reference password and a reference OTP, that allows access to the SP 18, according to the corresponding access policy.

When the user is successfully authenticated, by the UAS 16, at the logon session, the UAS 16 is arranged to generate and store data relating to the logon session. To generate the (logon) session data, the UAS 16 uses a predefined generation algorithm.

The session data includes preferably an ID relating to the (past) (logon) session. The session ID identifies the concerned successful user authentication session.

The session data may further include information relating to user authentication data that has been used to authenticate successfully the user 11.

The session data may include one or several flags relating to the (logon) session, such as a flag relating to a success or a failure of the user authentication, as a result relating to the (logon) user authentication.

When the user is successfully authenticated at the logon session, the UAS 16 is configured to send, to the LAG, the (generated) session data.

The UAS 16 is preferably adapted to verify whether session data to be received from the involved browser is or is not valid to access a requested service provided by an SP 18. When the session data is valid and preferably allows access to the SP 18, i.e. is (considered) sufficient to access the SP 18, the UAS 16 is configured to authorize or grant access to the requested service without requesting, through the browser, to the user further user authentication data. When the session data is valid but does not allow access to the SP 18 (i.e. is not sufficient to access the SP 18) because e.g., the provided user authentication data is not sufficient and/or the captured user access context or environment is not (considered) secure enough, the UAS 16 is preferably configured to request, through the browser, to the user, additional or further (user) authentication data and is configured, when further authentication data provided by the user matches further predetermined reference user authentication data, to authorize or grant access to the requested service. To authorize access to the requested service, the UAS 16 is arranged to transmit, through the browser, to the SP 18, either a part or all of the session data, as a cookie (that relates to a session of communication, for the user, through the browser, with the SP 18), or as a (digital) token that is generated by the UAS 16 and used for obtaining, from the SP 18, a cookie relating to an SSO session, so as to open an SSO session.

Otherwise, i.e. either if the session data is not valid because e.g., a predefined time period of the validity of the session data has expired or the user has not been successfully authenticated at the (last previous) logon session or further authentication data provided by the user does not match further predetermined reference user authentication data, the UAS 16 is configured to forbid or deny access to the requested service.

The UAS 16 plays a role of a user authenticator and, when applicable, i.e. when the user is successfully authenticated by using first reference user authentication data and possibly second reference user authentication data, preferably a role of an opener of an SSO session with an SP 18 requested to be accessed by the user 11.

The SP 18 is preferably connected, over a (bi-directional) wireless and/or wired link(s) 17, through the communication network(s) 14, to the PC 12.

The SP 18 is identified by a URI, like e.g., a URL, an IP address and/or the like, as an ID(s) relating to the SP 18. The SP 18 ID(s) may be entered by the user 11 or stored at the PC 12 side (e.g., in a PC 12 memory and/or an SE memory incorporated or coupled to the PC 12).

The SP 18 may be operated by an MNO, an MVNO, a bank operator, a service provider or on its behalf.

The SP 18 is hosted preferably by a second computing device including, among others, one or several CPUs and/or processor(s) (not represented), as data processing means, one or several memories (not represented), as data storing means, and one or several I/O interfaces that are all connected to each other.

The SP 18 (processor(s)) is used for running an application (or software) for providing a service(s).

The SP 18 may include (or be connected to) a server memory(ies) that stores a user database that includes data relating to a plurality of user accounts.

The SP 18 accesses the user database.

The user database comprises preferably a set of user accounts and, in association with each user account, one or several IDs relating to the concerned user, such as a username or an IMSI. Each user account may be associated with one or several IDs relating to a corresponding user device(s) and, as user device ID, such as an IP address, an MSISDN and/or an IMEI. Furthermore, each user ID is associated with corresponding reference (user) authentication data, as second reference user authentication data, such as a reference PIN, a reference password, a reference OTP or a reference password and a reference OTP.

The SP 18 is used for providing a service(s) when the user is successfully authenticated at least a previous session of user logon at the user device side and possibly by using second reference user authentication data to be provided by the user when the (logon) authentication data provided by the user is not sufficient in terms of security aspect.

Figure 2:
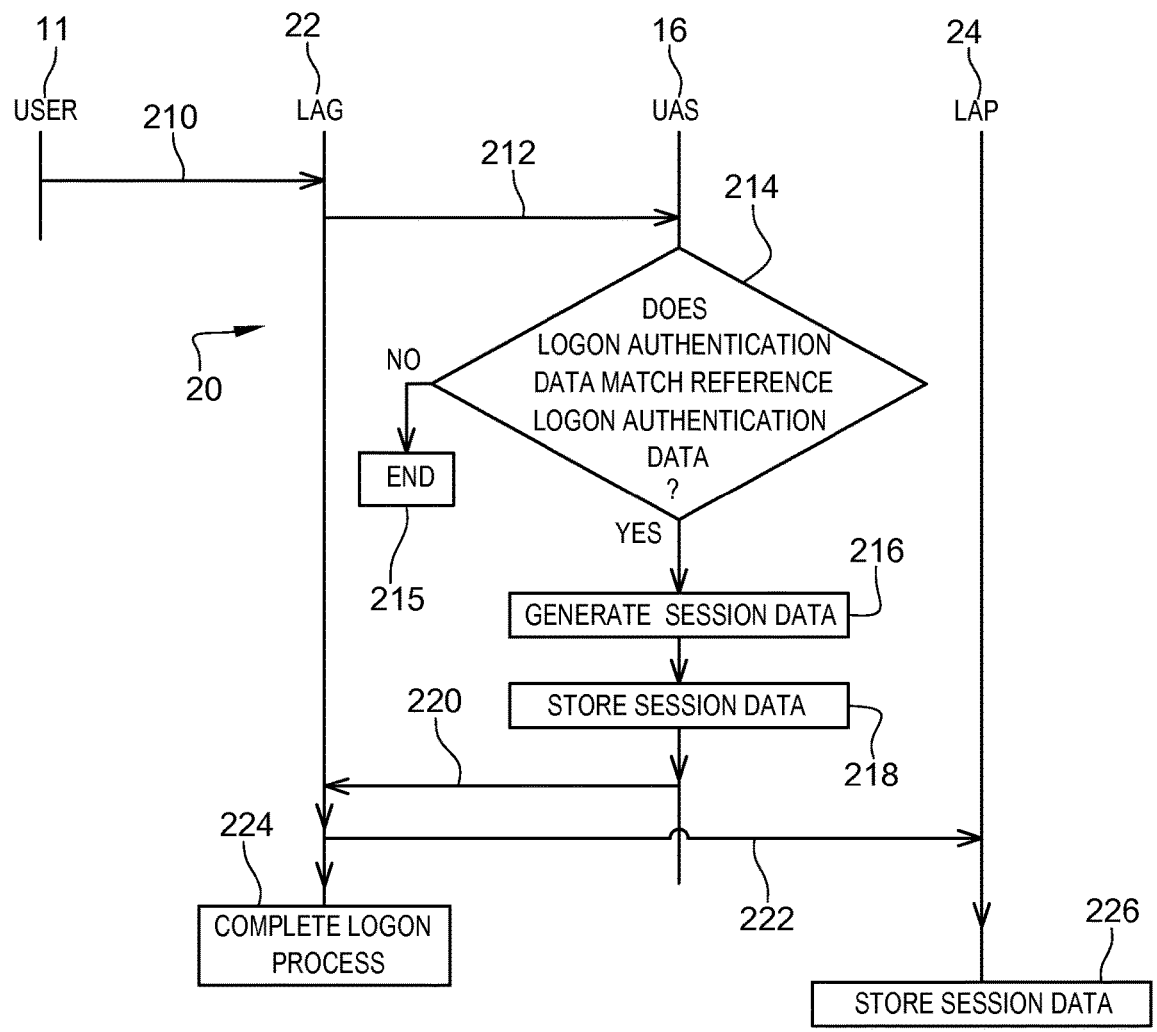
FIG. 2 represents a particular embodiment of a message flow between the user, the LAG, the UAS and the LAP of FIG. 1, at the logon session, according to the invention.

FIG. 2 depicts one example of a method 20 for managing access to a service, so as to logon the user 11, through the (PC OS) LAG 22, the UAS 16 and the LAP 24, to the PC (OS) and store, by the LAP 24, data relating to a (PC OS) (logon) session only when the user 11 is successfully authenticated to the UAS 16.

The PC user 11 provides the LAG 22 with logon user authentication data 210, as first user authentication data entered or submitted by the user 11 through an MMI and/or a sensor(s) included in and/or connected to the PC 12.

The LAG 22 connects to the UAS 16 and sends, to the UAS 16, the provided logon user authentication data 212, as first user authentication data.

Once the UAS 16 has received the first provided user authentication data, the UAS 16 verifies 214 whether the received logon (user) authentication data does or does not match predetermined reference logon (user) authentication data, as first (predetermined) reference user authentication data. The first reference user authentication data is stored in the first database that is accessible from the UAS 16 for the concerned user 11 in his/her user account.

If the received logon authentication data does not match the (predetermined) reference logon authentication data, then the UAS 16 fails to authenticate the PC user 11. The UAS 16 terminates 215 the launched logon process to forbid or deny access from the user 11 to the PC 12. The UAS 16 may address a user authentication failure message intended to the user 11.

Otherwise, i.e. if the received logon authentication data (or the first provided user authentication data) matches the (predetermined) reference logon authentication data (or the first (predetermined) reference user authentication data), the UAS 16 succeeds in authenticating the PC user 11. The UAS 16 authorizes the authenticated user 11 to continue the launched logon process, in order to allow the user 11 to gain access to the PC 12.

Once the UAS 16 has successfully authenticated the user 11, the UAS 16 generates 216 data relating to the (PC OS logon) session.

The session data includes preferably a session ID, such as a RaNDom (or RND) string, that identifies the successful user authentication session.

The session data includes preferably information relating to user authentication data that has been used to authenticate successfully the user 11.

The information relating to the user authentication data may include:
first reference user authentication data;
a signature relating to the UAS 16 that proves, when verified by a receiver of the UAS signature, that the session data originates from the UAS 16;
a public key relating to the UAS 16; and/or
a certificate relating to the UAS 16.

At least some information item relating to the user authentication data, such as the first reference user authentication data, may be encrypted by using an encryption key and a predefined encryption algorithm, so as to protect access to the concerned information item(s). A first receiving server, namely the UAS 16 or the SP 18, that receives the partly or wholly encrypted session data and that accesses a decryption key and a corresponding decryption algorithm is able to decrypt the partly or wholly encrypted session data, so as to access to the concerned information item(s).

The session data may include for a predefined validity time period, such as a few minutes or a few hours from the launched PC logon session event. The session data is thus allowed to be used for the validity time period. Once the validity time period has expired, the session data is thus no longer allowed to be used for accessing a service requested by the user 11.

The UAS 16 stores 218 the generated session data.
The UAS 16 sends to the LAG 22 the session data 220.
The LAG 22 sends to the LAP 24 the session data 222.
The LAG 22 completes 224 the logon process, so that the user 11 gains access to the PC 12.

The user 11 is successfully connected to the PC 12.

Once the LAP 24 has received the session data, the LAP 24 stores 226 the session data.

Thus, the LAP 24 may retrieve the session data and provide any browser or a specific browser with the session data.

Figure 3:
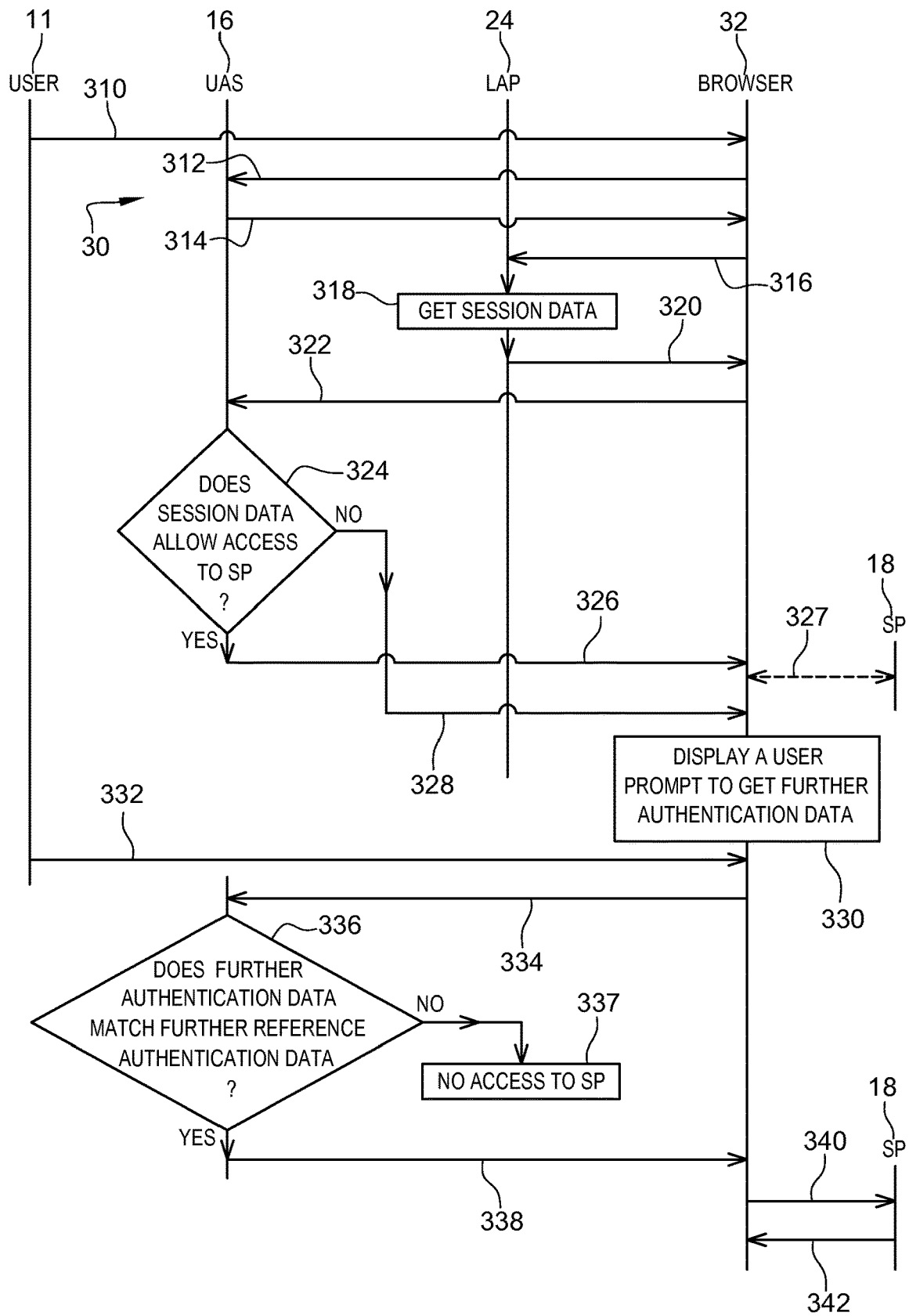
FIG. 3 is a first embodiment of a message flow between the user, the browser, the UAS, the LAP and the SP of FIG. 1 to access (or not), after the logon session of FIG. 2, through the UAS, the SP, according to the invention.

FIG. 3 depicts one example of a method 30 for managing access to a service, so as to launch, from the UAS 16, an SSO session, through the browser 32, with the SP 18, only when the user 11 is authenticated to the UAS 16 at least during the logon to the PC 12, in order to login the user 11 to the SP 18.

The user 11 launches a (PC) browser 32 by submitting to the browser 32 a request 310 for accessing a service, such as a request from downloading a home page originating from the SP 18.

To submit the service access request, the user 11 types the home page address or selects a remote server ID within a set of one or several predefined server IDs.

The service access request includes or is accompanied with e.g., an URL relating to the SP 18, as an ID relating to a server to be addressed.

The service provided by the SP 18 may be e.g., a secure remote storage of pictures, as user data.

The browser 32 is arranged to re-direct to the UAS 16 the service access request. The browser 32 transmits to the UAS 16 the service access request 312.

The browser 32 becomes a bridge of communication between the LAP 24 and the UAS 16.

The UAS 16 sends to the browser 32 a command 314 for displaying e.g., data not relating to a requested SP 18 or a holding page that includes or is accompanied with e.g., a corresponding page to be displayed or the like, so as to prevent the browser 32 from displaying any data/page relating to a session of login to the UAS 16 (or the SP 18).

Once the browser 32 has received data/page from the UAS 16, the browser 32 displays (not represented) e.g., the (holding) page. Thus, the browser 32 does not display any data/page relating to the UAS 16 as long as the UAS 16 has not authorized the browser 32 to login to the SP 18. The browser 32 does not display any information relating to the UAS 16 during a data exchange between the browser 32 and the UAS 16 except for getting additional user authentication data, when applicable.

The user 11 is not informed about a login session process that occurs during the displaying of the (holding) page to make the user 11 wait until the UAS 16 recognizes that the user 11 has been previously authenticated possibly completed by an additional authentication, as a step-up authentication, when applicable (i.e. if the captured user context or environment of the SP login request requires it or if the already provided first user authentication data is not sufficient to access the SP 18).

The UAS 16 sends to the browser 32, besides the displaying command 314, a script for getting (PC logon) session data from the LAP 24.

The browser 32 sends to the LAP 24 a request 316 for getting the (PC logon) session data, such as "GET sessiondata", by executing the session data getting script, as a browser add-on.

The LAP 24 retrieves or gets 318 the session data, when present. The retrieved session data relates to the (last previous) PC logon session event during which the user 11 has successfully authenticated to the UAS 16.

Once retrieved, the LAP 24 sends to the browser 32 the retrieved session data 320 preferably with a script for sending to the UAS 16 the session data.

The browser 32 sends to the UAS 16 the session data 322, such as "POST sessiondata", by executing preferably the session data sending script, as a browser add-on.

Alternately, instead of executing the session data sending script, the browser 32 is configured so that the browser 32 sends, on its own, to the UAS 16, the session data.

Once the UAS 16 has received the session data, the UAS 16 verifies 324 whether the session data is or is not valid and optionally, only if the session data is valid, whether the session data does or does not allow access to the SP 18.

Optionally, the UAS 16 analyses and assesses the session data with respect to a required security level for accessing the requested service to be satisfied. The UAS 16 knows based on the session data which first user authentication data has been used to authenticate successfully the user 11. The requested service may require, according to the SP access policy, that the user 11 be authenticated with additional user authentication data, as second user authentication data, like e.g., an OTP, with respect to the (already provided) first user authentication data, like e.g., a password. The UAS 16 may further analyse and assess other data associated with the session data, such as the flag(s) retrieved locally based on the session data, that is accessible to the UAS 16.

If the session data is valid and allows preferably access to the SP 18, then the UAS 16 recognizes that the UAS 16 has previously authenticated the PC user 11 and that the session data satisfies the required security level for accessing the requested service. In such a positive case, the UAS 16 authorizes access to the (requested) service by sending to the browser 32 data 326, such as either a cookie to inject in the browser 32 and to be sent to the SP 18 to open an SSO session or a request for setting a cookie along with preferably a (digital) token to be used by the browser 32 to get from the SP 18 an SSO session cookie, so as to establish between the browser 32 and the SP 18 an SSO session. The browser 32 launches, based on the received data, a login session to the SP 18 by sending to the SP 18 either the cookie or the request for setting a cookie along with preferably the token 327. The SP 18 downloads or sends to the browser 32 a home page relating to the SP 18 to allow access to the SP 18. The browser 32 displays (not represented) the SP home page. Up to such an SP home page displaying, the user 11 is not aware about such a secure login process since he/she does not see any message during the steps 312, 314, 316, 318, 320, 322, 324, 326 and 327.

Otherwise, i.e. if the session data is valid and the session data does not allow accessing the SP 18, the UAS 16 recognizes that the UAS 16 has previously authenticated the PC user 11 and that the session data does not allow accessing the SP 18, i.e. the session data does not satisfy the required security level for accessing the requested service, according to the SP access policy. In such a negative case, the UAS 16 does not authorize access to the (requested) service by sending to the browser 32 a request 328 for displaying a prompt message for getting additional user authentication data, as second user authentication data, with respect to the first user authentication data that has been used, by the UAS 16, to authenticate successfully the user 11 at the logon session. The browser 32 displays 330, based on the prompt message displaying request, on the PC display screen 122 (or a display screen connected to the PC 12), a user prompt to get, from the user, additional user authentication data. Up to such a user prompt message displaying, the user 11 is not aware about such a secure login process since he/she does not see any message during the steps 312, 314, 316, 318, 320, 322, 324 and 328.

The user 11 provides the browser 32 with e.g., an OTP, as second provided user authentication data 332, entered or submitted by the user 11.

The browser 32 sends, to the UAS 16, the second provided user authentication data 334.

The UAS 16 verifies 336 whether the second provided user authentication data does or does not match second (predetermined) reference user authentication data, such as a predetermined reference OTP.

If the second provided user authentication data does not match the second reference user authentication data, then the UAS 16 terminates 337 the SP login process to forbid or deny access from the user 11 to the SP 18. The UAS 16 may address to the browser 32 a user authentication failure message (not represented) intended to the user 11.

Otherwise, i.e. if the second provided user authentication data matches the second reference user authentication data, the UAS 16 authorizes access to the (requested) service by sending to the browser 32 data 338, such as either a cookie to inject in the browser 32 and to be sent to the SP 18 to open an SSO session or a request for setting a cookie along with preferably a token to be used by the browser 32 to get from the SP 18 an SSO session cookie, so as to establish between the browser 32 and the SP 18 an SSO session. The browser 32 launches, based on the received data, a login session to the SP 18 by sending to the SP 18 either the cookie or the request for setting a cookie along with preferably the token 340.

The SP 18 downloads or sends to the browser 32 a home page 342 relating to the SP 18 to allow access to the SP 18. The browser 32 displays (not represented) the SP home page.

The user 11 is successfully logged in to the SP 18 without re-entering or re-submitting the first user authentication data that has been previously used to authenticate to logon to the PC 12.

The user 11 may have been prompted to provide further user authentication data without re-entering or re-submitting the first user authentication data that has been previously used to authenticate to logon to the PC 12, so as to log in to the SP 18, when the first user authentication data is not sufficient to satisfy a required security level to access the SP 18.

Figure 4:
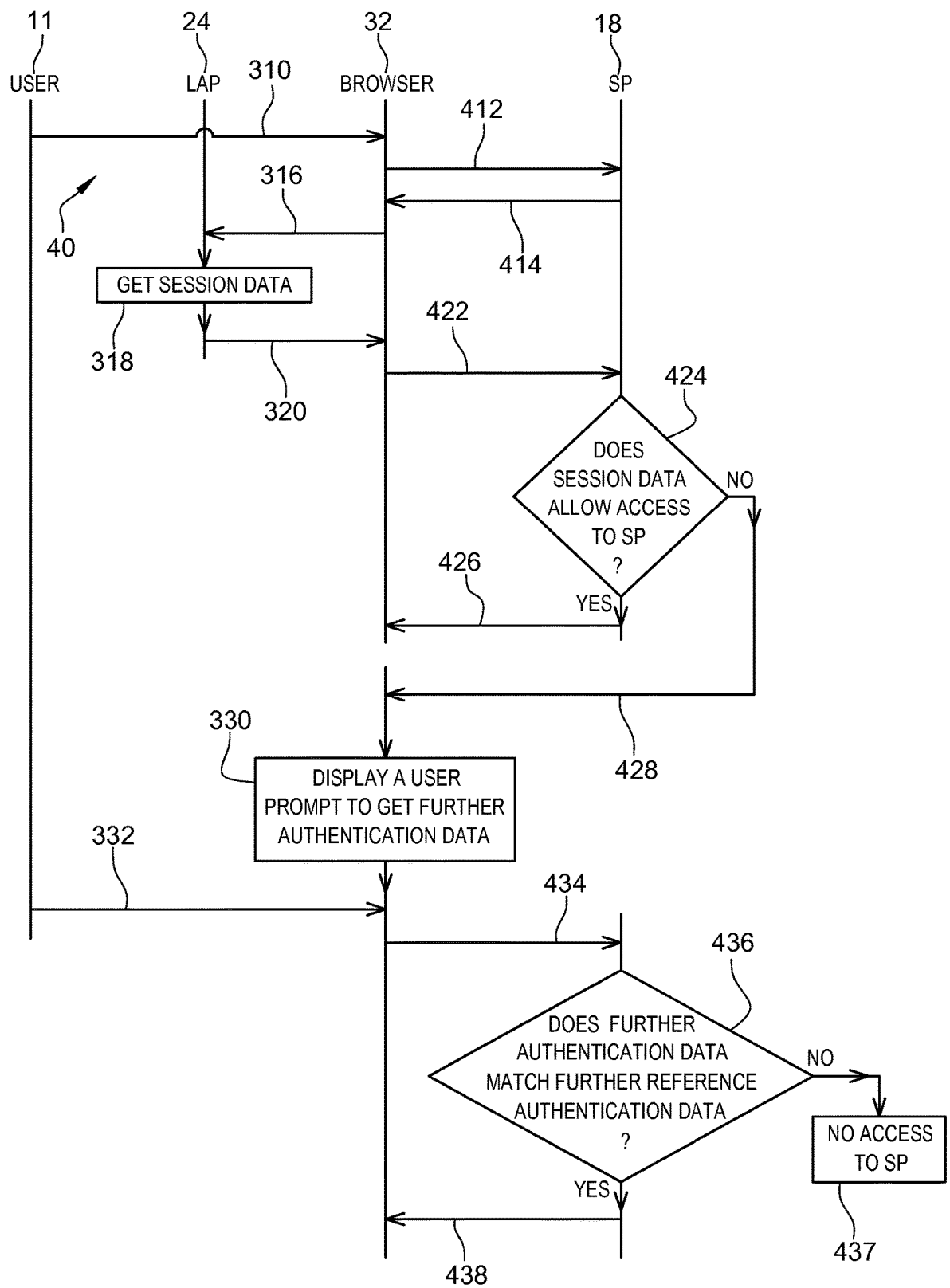
FIG. 4 is a second embodiment of a message flow between the user, the browser, the LAP and the SP of FIG. 1 to access (or not), after the logon session of FIG. 2, the SP, according to the invention.

FIG. 4 depicts another example of a method 40 for managing access to a service requested from the user 11, only when the user 11 is successfully authenticated to the UAS 16 at least during the logon to the PC 12, in order to log into the SP 18.

The user 11 launches a (PC) browser 32 by submitting to the browser 32 a request 310 for accessing a service, such as a request from downloading a home page originating from the SP 18.

To submit the service access request, the user 11 types the home page address or selects a remote server ID within a set of one or several predefined server IDs.

The service access request includes or is accompanied with e.g., an URL relating to the SP 18, as an ID relating to a server to be addressed.

The service provided by the SP 18 may be a secure remote storage of pictures, as user data.

The browser 32 transmits the service access request 412 directly (i.e. without involving the UAS 16) to the SP 18.

The SP 18 downloads or sends to the browser 32 a command 414 for displaying data accompanied with a home page relating to the SP 18.

Once the browser 32 has received the downloaded data/page from the SP 18, the browser 32 displays (not represented) the SP home page.

The browser 32 is configured so that the browser 32 sends, to the LAP 24, a request 316 for getting the (PC logon) session data, such as "GET sessiondata".

Alternately, instead of a configured browser, the SP 18 sends, besides the displaying command 414, a script for getting (PC logon) session data from the LAP 24.

The browser 32 becomes a bridge of communication between the LAP 24 and the SP 18.

The browser 32 sends to the LAP 24 a request 316 for getting the (PC logon) session data, such as "GET sessiondata", possibly by executing the session data getting script, as a browser add-on.

The LAP 24 retrieves or gets 318 the session data, when present. The retrieved session data relates to the last previous PC logon session event during which the user 11 authenticates successfully to the UAS 16.

Once retrieved, the LAP 24 sends to the browser 32 the retrieved session data 320 preferably with a script for sending to the SP 18 the session data.

The browser 32 sends to the SP 18 the session data 422, such as "POST sessiondata".

Once the SP 18 has received the session data, the SP 18 verifies 424 whether the session data is or is not valid and optionally, only if the session data is valid, whether the session data does or does not allow access to the SP 18.

Optionally, the SP 18 analyses and assesses the session data with respect to a required security level for accessing the requested service to be satisfied. The requested service may require that the user 11 be authenticated by additional user authentication data, as second user authentication data, like e.g., an OTP, with respect to the already first provided user authentication data, like e.g., a password. The SP 18 may further analyse and assess other data included in the session data, such as the flag(s) included in the session data.

If the session data is valid and allows preferably access to the SP 18, then the SP 18 recognizes that the UAS 16 has previously authenticated the PC user 11 and that the session data satisfies the required security level for accessing the requested service. In such a positive case, the SP 18 authorizes access to the (requested) service by sending to the browser 32 data 426 possibly accompanied with a cookie to inject in the browser 32 and to be sent back to the SP 18 to open an SSO session, so as to establish between the browser 32 and the SP 18 an SSO session. The browser 32 displays (not represented), based on the received data, the SP home page or another SP page. Up to such an SP page displaying, the user 11 is not aware about such a secure login process since he/she does not see any message during the steps 316, 318, 320, 422 and 424. The user 11 is successfully logged into the SP 18 without re-entering or re-submitting the first user authentication data that has been previously used to authenticate to logon to the PC 12.

Otherwise, i.e. if the session data is valid and the session data does not allow accessing the SP 18, the SP 18 recognizes that the UAS 16 has previously authenticated the PC user 11 and that the session data does not satisfy the required security level for accessing the requested service, according to the SP access policy. In such a negative case, the UAS 16 does not authorize access to the (requested) service by sending to the browser 32 a request 428 for displaying a prompt message for getting additional user authentication data, as second user authentication data, with respect to the first user authentication data that has been used, by the UAS 16, to authenticate successfully the user 11 at the logon session. The browser 32 displays 330, based on the prompt message displaying request, on the PC display screen 122 (or a display screen connected to the PC 12), a user prompt to get, from the user, additional user authentication data. Up to such a user prompt message displaying, the user 11 is not aware about such a secure login process since he/she does not see any message during the steps 316, 318, 320, 422, 424 and 428.

The user 11 provides the browser 32 with e.g., an OTP, as second provided user authentication data 332, entered or submitted by the user 11.

The browser 32 sends to the SP 18 the second provided user authentication data 434.

The SP 18 verifies 436 whether the second provided user authentication data does or does not match second (predetermined) reference user authentication data, such as a predetermined reference OTP.

If the second provided user authentication data does not match the second reference user authentication data, then the SP 18 terminates 437 the SP login process to forbid or deny access from the user 11 to the SP 18. The SP 18 may address to the browser 32 a user authentication failure message (not represented) intended to the user 11.

Otherwise, i.e. if the second provided user authentication data matches the second reference user authentication data, the SP 18 authorizes access to the service by sending to the browser 32 data 438 accompanied preferably with a cookie to be sent back by the browser 32 to the SP 18, so as to establish between the browser 32 and the SP 18 an SSO session to allow access to the SP 18. The browser 32 displays (not represented), based on the received data, the SP page. Optionally, the browser 32 sends to the SP 18 the cookie.

The user 11 is successfully logged in to the SP 18 without re-entering or re-submitting the first user authentication data that has been previously used to authenticate to logon to the PC 12. The user 11 may have been prompted to provide further user authentication data, so as to log in to the SP 18, when the first user authentication data is not sufficient to satisfy a required security level to access the SP 18.

The proposed solution does not need to configure the browser to transmit the session data to either the UAS 16 (for the first embodiment described in conjunction with FIG. 3) or the SP 18 (for the second embodiment described in conjunction with FIG. 4).

The proposed solution is based on the UAS that has successfully authenticated the user during the logon session prior to accessing therefore securely the SP.

The proposed solution is convenient for the user and therefore user-friendly since, when the user has been successfully authenticated during a local device logon session, the user does not enter or submit again the user authentication data that has been used to authenticate to logon to the local device.

The embodiments that have been described are not intended to limit the scope of the concerned invention. Other embodiments may be given. As another embodiment example, instead of exchanging with a remote UAS, the browser exchanges with a local UAS that provides a user authentication service, based on at least previous logon authentication data, that is requested to access a service provided by an SP without that the user enters or submits again the logon authentication data.

The invention claimed is:

1. A method for managing access to a service, comprising:
    a) authenticating successfully, by a user authentication server, through a logon agent, a device user, the device comprising the logon agent;
    b) sending, by the user authentication server, to the logon agent, session data, the session data relating to the successful authentication session and further including information relating to user authentication data that has been used to authenticate successfully the user;
    c) sending, by the logon agent, to a logon application the session data;
    d) storing, by the logon application, the session data;
    e) receiving, by at least one browser, from the device user, a first request for accessing the service, the first service access request including or being accompanied with an identifier relating to a first server to be addressed, the device comprising the at least one browser;
    f) sending, by the logon application, to the at least one browser, the session data;
    g) sending, by the browser, based on the first server identifier, to, as a first receiving server, either the first server or through the user authentication server, to the first server, the session data;
    h) verifying, by the first receiving server, whether the session data is or is not valid; and
    i) if the session data is valid, analysing, by the first receiving server, whether information included in the session data relating to user authentication data, and that has been used to authenticate successfully the user, does or does not allow access to the requested service;
    j) authorizing, by the first receiving server, access to the service only if the session data is valid and if the information included in the session data relating to user authentication data, and that has been used to authenticate successfully the user, allows access to the requested service.

2. The method according to claim 1, wherein, after step e) and prior to step f), the browser sends to the logon application a request for getting the session data.

3. The method according to claim 1, wherein the session data includes a session identifier, the session identifier identifying the successful user authentication session.

4. The method according to claim 3, wherein the information relating to the user authentication data includes at least one element of a group comprising:
    first reference user authentication data;
    at least one information item relating to the session event;
    at least one indicator relating to the user authentication data that has been used to authenticate successfully the user;
    a signature relating to the user authentication server;
    a public key relating to the user authentication server; and
    a certificate relating to the user authentication server.

5. The method according to claim 1, wherein, once the at least one browser has received the first service access request, the browser sends to the user authentication server the first service access request, the user authentication server sends to the browser a request for not displaying any information relating to the user authentication server, the browser displaying no information relating to the user authentication server during a data exchange between the browser and the user authentication server.

6. The method according to claim 1, wherein the method further comprises the following steps:
    the first receiving server sends, if the session data is valid and the session data does not allow access to the requested service, to the browser a request for displaying a prompt message for getting additional data relating to the user authentication with respect to the first user authentication data that has been used by the user authentication server to authenticate successfully the user;

the browser displays, based on the prompt message displaying request, on at least one display screen incorporated in or connected to the device, a message for getting, from the device user, additional data relating to the user authentication;

the user provides, through the browser, the first receiving server with second user authentication data;

the first receiving server verifies whether the second provided user authentication data does or does not match second predetermined reference user authentication data; and the first receiving server authorizes access to the requested service only if the second provided user authentication data matches the second reference user authentication data.

7. The method according to claim 1, wherein, to authenticate successfully to the user authentication server, the method comprises the following steps:

the user provides the logon agent with first user authentication data;

the logon agent sends to the user authentication server the first provided user authentication data;

the user authentication server verifies whether the first provided user authentication data does or does not match first predetermined reference user authentication data; and the user authentication server authenticates successfully the user only if the first provided user authentication data matches the first reference user authentication data.

8. The method according to claim 1, wherein, to carry out the step i), when the user authentication server is the first receiving server, the user authentication server opens a Single Sign On, SSO, session by sending, through the browser, to the first server a request for setting a cookie.

9. A system for managing access to a service, the system comprising a device and a user authentication server, the device comprising a logon agent and at least one browser, wherein the device authenticates successfully, through the logon agent, to the user authentication server, a device user;

wherein the user authentication server sends, to the logon agent, session data, the session data relating to the successful authentication session and further including information relating to user authentication data that has been used to authenticate successfully the user;

wherein the logon agent sends to a logon application the session data;

wherein the logon application stores the session data;

wherein the at least one browser receives, from the device user, a first request for accessing the service, the first service access request including or being accompanied with an identifier relating to a first server to be addressed;

wherein the logon application sends to the at least one browser the session data;

wherein the at least one browser sends, based on the first server identifier, to, as a first receiving server, either the first server or through the user authentication server, to the first server, the session data; and wherein the first receiving server:

verifies, whether the session data is or is not valid;

if the session data is valid, analysing, by the first receiving server, whether information included in the session data relating to user authentication data, and that has been used to authenticate successfully the user, does or does not allow access to the requested service; and authorizes access to the service, only if the session data is valid and if the information included in the session data relating to user authentication data, and that has been used to authenticate successfully the user, allows access to the requested service.

10. A method for managing access to a service, comprising:

a) authenticating successfully, by a user authentication server, through a logon agent, a device user, the device comprising the logon agent;

b) sending, by the user authentication server, to the logon agent, session data, the session data relating to the successful authentication session;

c) sending, by the logon agent, to a logon application the session data;

d) storing, by the logon application, the session data;

e) receiving, by at least one browser, from the device user, a first request for accessing the service, the first service access request including or being accompanied with an identifier relating to a first server to be addressed, the device comprising the at least one browser;

f) sending, by the logon application, to the at least one browser, the session data;

g) sending, by the browser, based on the first server identifier, to, as a first receiving server, either the first server or through the user authentication server, to the first server, the session data;

h) verifying, by the first receiving server, whether the session data is or is not valid; and i) authorizing, by the first receiving server, only if the session data is valid, access to the service wherein, once the at least one browser has received the first service access request, the browser sends to the user authentication server the first service access request, the user authentication server sends to the browser a request for not displaying any information relating to the user authentication server, the browser displaying no information relating to the user authentication server during a data exchange between the browser and the user authentication server.

\* \* \* \* \*